United States Patent
Satoh

(10) Patent No.: US 10,623,191 B2
(45) Date of Patent: Apr. 14, 2020

(54) INFORMATION PROCESSING APPARATUS, INFORMATION PROCESSING SYSTEM, INFORMATION PROCESSING METHOD, AND RECORDING MEDIUM

(71) Applicant: Jun Satoh, Tokyo (JP)

(72) Inventor: Jun Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 292 days.

(21) Appl. No.: 15/459,129

(22) Filed: Mar. 15, 2017

(65) Prior Publication Data

US 2017/0272257 A1 Sep. 21, 2017

(30) Foreign Application Priority Data

Mar. 18, 2016 (JP) .................................. 2016-056179

(51) Int. Cl.
| H04L 9/32 | (2006.01) |
| H04L 29/06 | (2006.01) |
| H04L 9/08 | (2006.01) |

(52) U.S. Cl.
CPC .......... *H04L 9/3268* (2013.01); *H04L 9/0894* (2013.01); *H04L 63/0823* (2013.01)

(58) Field of Classification Search
CPC . H04L 9/3268; H04L 9/0894; H04L 63/0823; H04L 63/10
USPC ........................................................ 713/158
See application file for complete search history.

(56) References Cited

U.S. PATENT DOCUMENTS

| 7,096,363 B2* | 8/2006 | Kon ........................ G06Q 20/40 705/44 |
| 8,948,726 B2* | 2/2015 | Smith .................... H04W 8/183 455/406 |
| 8,996,002 B2* | 3/2015 | Rodgers ................ H04W 8/183 455/435.2 |

(Continued)

FOREIGN PATENT DOCUMENTS

| JP | 2005-204283 | 7/2005 |
| JP | 2005-223892 | 8/2005 |

(Continued)

*Primary Examiner* — Shanto Abedin
(74) *Attorney, Agent, or Firm* — Harness, Dickey & Pierce, P.L.C.

(57) ABSTRACT

An apparatus, system, and a method, each of which stores, in a memory, for each one of a plurality of users, information regarding a service provision contract indicating a content of services to be provided to the user; obtains a service provision contract indicating services to be provided to a first user in response to an access from the first user, the first user being one of the plurality of users; assigns first identification information to the service provision contract for the first user; obtains, from a certificate authority, an electronic certificate including the first identification information assigned to the service provision contract for the first user, as an individual certificate for the first user; transmits the individual certificate to a transmission destination associated with the first user; and determines to provide services according to the service provision contract identified with the first identification information included in the individual certificate, to an apparatus authenticated using the individual certificate.

16 Claims, 12 Drawing Sheets

(56) References Cited

U.S. PATENT DOCUMENTS

| | | | |
|---|---|---|---|
| 2002/0046336 A1* | 4/2002 | Kon | G06F 21/10 |
| | | | 713/156 |
| 2003/0154407 A1* | 8/2003 | Kato | H04L 63/0492 |
| | | | 726/5 |
| 2004/0030887 A1* | 2/2004 | Harrisville-Wolff | |
| | | | H04L 63/0442 |
| | | | 713/155 |
| 2005/0160476 A1 | 7/2005 | Kakii | |
| 2005/0188196 A1* | 8/2005 | Kakii | H04L 9/3263 |
| | | | 713/156 |
| 2006/0100888 A1* | 5/2006 | Kim | G06Q 20/3674 |
| | | | 705/67 |
| 2006/0106920 A1* | 5/2006 | Steeb | G06F 9/5005 |
| | | | 709/220 |
| 2008/0189774 A1* | 8/2008 | Ansari | G06Q 30/04 |
| | | | 726/7 |
| 2009/0100266 A1* | 4/2009 | Abe | H04L 63/0861 |
| | | | 713/175 |
| 2009/0265545 A1* | 10/2009 | Satoh | H04L 9/3263 |
| | | | 713/156 |
| 2011/0083169 A1* | 4/2011 | Moeller | H04L 63/0853 |
| | | | 726/5 |
| 2012/0166248 A1* | 6/2012 | Silberstein | G06Q 10/06 |
| | | | 705/7.28 |
| 2014/0122873 A1* | 5/2014 | Deutsch | H04L 63/20 |
| | | | 713/158 |
| 2017/0257360 A1* | 9/2017 | Gattu | H04L 63/0823 |

FOREIGN PATENT DOCUMENTS

| | | |
|---|---|---|
| JP | 2006-067135 | 3/2006 |
| JP | 2009-260703 | 11/2009 |
| JP | 2012-252401 | 12/2012 |

* cited by examiner

SHIPMENT STATE: NO CERTIFICATE

INSTALLED STATE: CERTIFICATE IS PRESENT

INFORMATION PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-056179, filed on Mar. 18, 2016, in the Japan Patent Office, the entire disclosure of which is hereby incorporated by reference herein.

BACKGROUND

Technical Field

The present invention relates to an information processing apparatus, an information processing system, an information processing method, and a recording medium.

Description of the Related Art

The recent server in a cloud environment provides services to a client in a user-side environment, to extend functions of the client. While the client is able to use services provided by the server, various kinds of information may be provided to the server. To protect such information transmitted from the client, various method have been applied to secure a communication path or data for transmission.

SUMMARY

Example embodiments of the present invention include an information processing apparatus, which: stores, in a memory, for each one of a plurality of users, information regarding a service provision contract indicating a content of services to be provided to the user; obtains a service provision contract indicating services to be provided to a first user in response to an access from the first user, the first user being one of the plurality of users; assigns first identification information to the service provision contract for the first user; obtains, from a certificate authority, an electronic certificate including the first identification information assigned to the service provision contract for the first user, as an individual certificate for the first user; transmits the individual certificate to a transmission destination associated with the first user; and determines to provide services according to the service provision contract identified with the first identification information included in the individual certificate, to an apparatus authenticated using the individual certificate.

Example embodiments of the present invention include an information processing system, an information processing method, and a non-transitory recording medium storing a control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
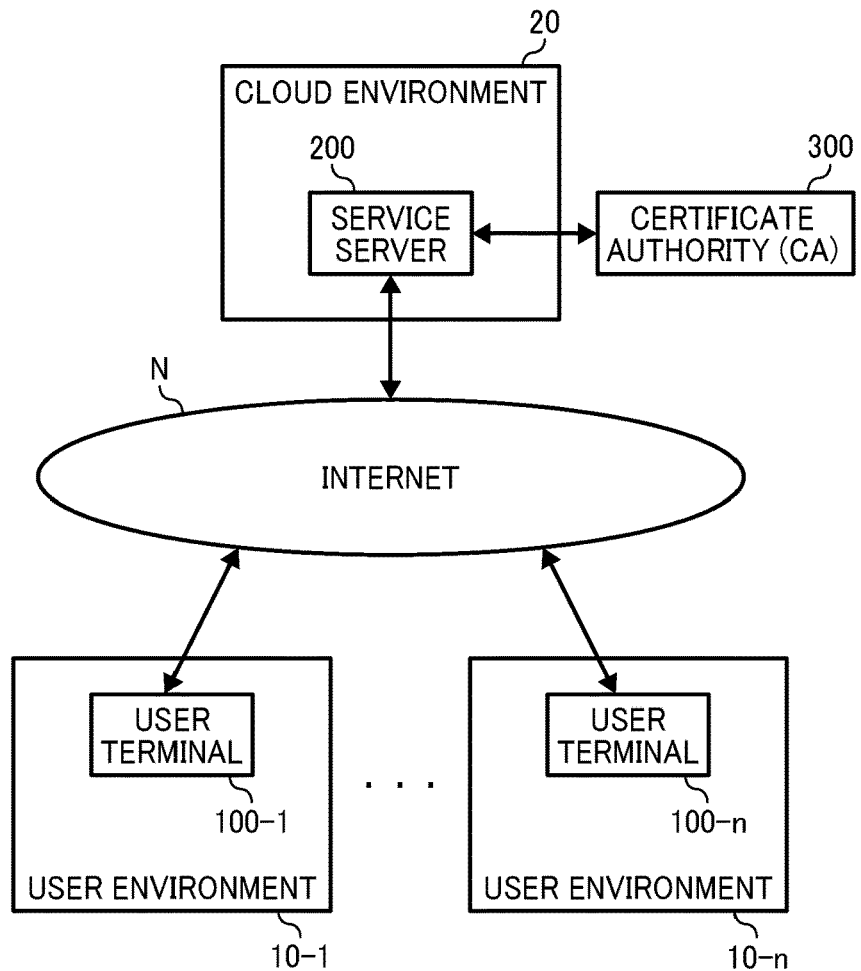
FIG. 1 is a diagram illustrating an example of arrangement of various apparatuses including a service server, as an example of an information processing apparatus, according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the present invention will be described referring to the drawings.

FIG. 1 illustrates an example of arrangement of various apparatuses including a service server, as an example of an information processing apparatus, according to an embodiment of the present invention.

In the example illustrated in FIG. 1, the service server 200 is an information processing apparatus according to an embodiment of the present invention. The service server 200, which is provided in a cloud environment 20, is able to broadly provide services for apparatuses on the Internet N (however, other than the Internet N, a network such as a local network may be used).

A certificate authority (CA) 300 issues an electronic certificate to be used by the service server 200 and any one of a plurality of user terminals 100-1 to 100-$n$. The operator of the CA 300 may be the same as or different from the operator of the service server 200.

Here, the user terminals 100-1 to 100-$n$ may be collectively referred to as the user terminal (hereinafter, in a case where individual user terminals may not be discriminated from each other, a reference numeral having no number after "-" is used, this similarly applies to the other reference numerals). The user terminal 100 is operated by a user using a service provided by the service server 200. More specifically, the user terminal 100 may be an apparatus having high versatility such as a personal computer (PC), a tablet computer, or a smartphone or any other apparatus such as a digital multifunction peripheral (MFP), a printer, a facsimile machine, a projector, or an electronic conference system. The user terminal may have a function for receiving authentication by accessing the service server 200 through the Internet N and using a service provided by the service server 200.

In the following, the user terminal 100 uses a service provided by the service server 200 when the user terminal 100 receives authentication from the service server 200 by using an individual certificate that is an electronic certificate including identification information of a use contract (a service provision contract viewed from the service server 200 side) of the service provided by the service server 200.

A user environment 10 in which the user terminal 100 is provided is an arbitrary network environment in which a user uses the user terminal 100 such as user's own house, a company, a school, or a public network. In FIG. 1, while one user terminal 100 is provided in each user environment 10, it is apparent that a plurality of user terminals 100 may be provided. In addition, it is apparent that an apparatus other than the user terminal 100 may be present in the user environment 10.

Figure 2:
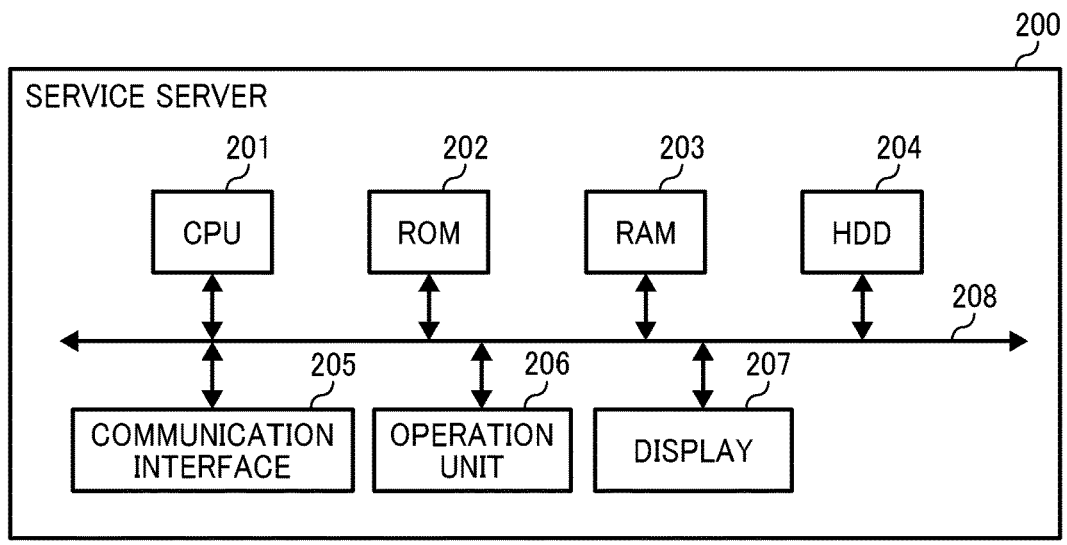
FIG. 2 is a diagram illustrating a hardware configuration of the service server illustrated in FIG. 1.

FIG. 2 illustrates a hardware configuration of the service server 200 illustrated in FIG. 1

As illustrated in FIG. 2, the service server 200 includes a central processing unit (CPU) 201, a read-only memory (ROM) 202, a random access memory (RAM) 203, a hard disk drive (HDD) 204, a communication interface (I/F) 205, an operation unit 206, and a display 207, which are coupled through a system bus 208.

The CPU 201 controls entire operation of the service server 200 by executing a program stored in the ROM 202 or the HDD 204 by using the RAM 203 as a work area, to achieve various functions including functions to be described with reference to FIG. 3.

The ROM 202 and the HDD 204 are non-volatile storage media (storage units) and stores various programs executed by the CPU 201 and various kinds of data to be described later.

The communication I/F 205 is an interface that is used for communicating with any other apparatus such as the user terminal 100 through the Internet N.

The operation unit 206 receives an operation from a user and may be configured by various keys, buttons, a touch panel, or the like.

The display 207 is used to present an operation state of the service server 200, a set content, a message or the like to the user and includes a liquid crystal display, a lamp, and the like.

The operation unit 206 and the display 207 may be externally attached. In a case where the service server 200 may not directly receive an operation from a user (reception of an operation or presentation of information may be performed by an external apparatus coupled through the communication I/F 205), the operation unit 206 and the display 207 may not be provided.

The user terminal 100 has a hardware configuration substantially similar to that described in FIG. 2. However, the model or the performance may not be the same as the model or the performance illustrated in FIG. 2, and any other memory may be used in place of the HDD 204.

In the following embodiments, the service server 200 manages information of a service provision contract for an apparatus such as the user terminal 100 or the like and an individual certificate to be used by the user terminal 100 in association with each other, and a life cycle is common to the service provision contract and the individual certificate.

Figure 3:
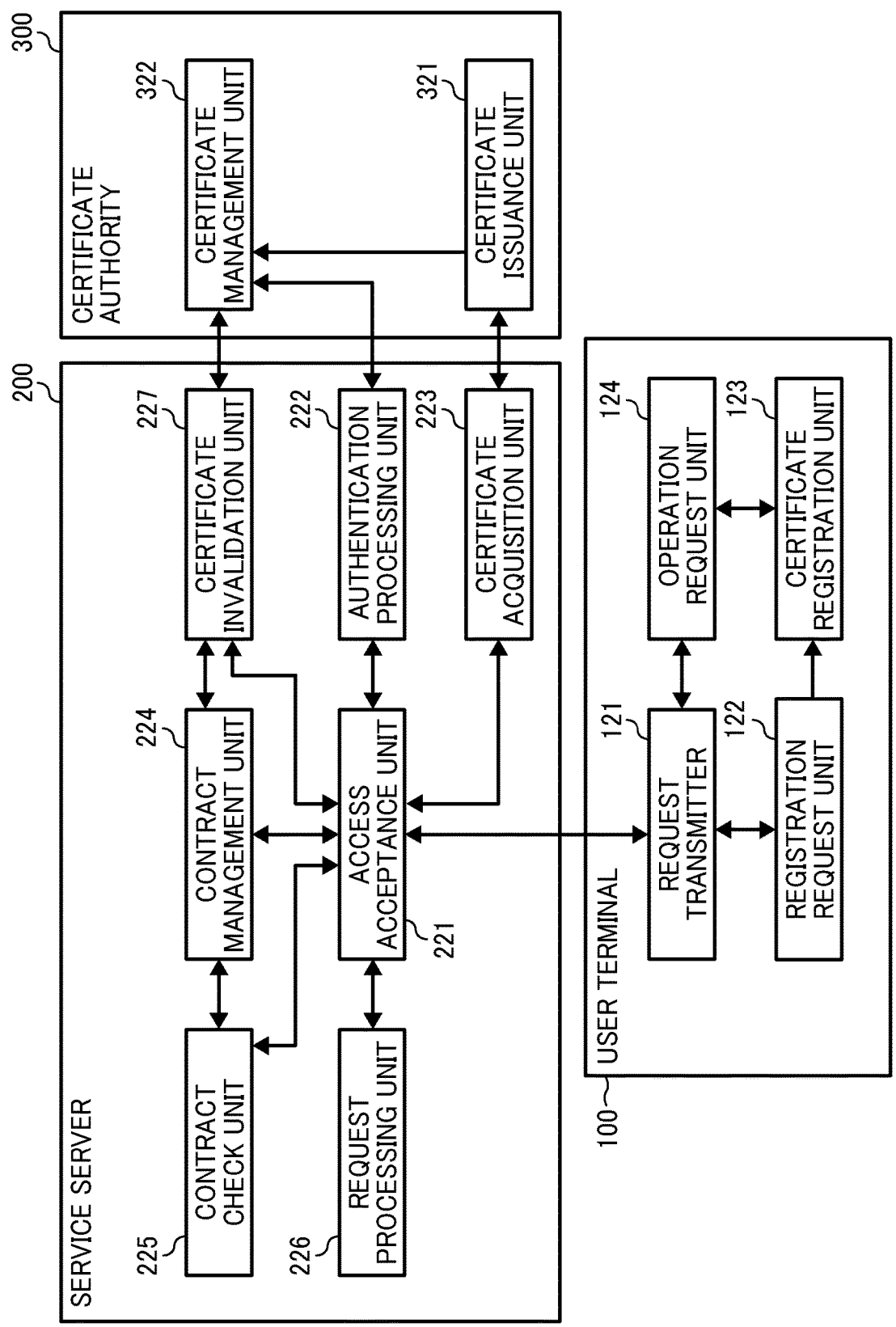
FIG. 3 is a diagram illustrating a functional configuration relating to a certificate, a service provision contract, and service handling among functions of a user terminal, a service server, and a certificate authority (CA) illustrated in FIG. 1.

FIG. 3 is a diagram illustrating a functional configuration of functions relating to a certificate, a service provision contract, and service handling among functions of the user terminal 100, the service server 200, and the CA 300. The function of each unit illustrated in FIG. 3 is achieved by a CPU of each apparatus controlling hardware by executing a control program.

As illustrated in FIG. 3, the user terminal 100 includes a request transmitter 121, a registration request unit 122, a certificate registration unit 123, and an operation request unit 124.

The request transmitter 121 transmits a request for requesting the service server 200 to execute a certain operation based on a request. Examples of such request include a request from an operator in accordance with operator's instruction and a request from the user terminal 100.

In any of the cases, the request transmitter 121 requests an access acceptance unit 221 of the service server 200 to perform device authentication using an individual certificate or a common certificate to be described later. When the authentication is successful, the request transmitter 121 transmits a request for an operation to the access acceptance unit 221. Here, the common certificate is an electronic certificate that is commonly used by a plurality of apparatuses receiving the provision of a service from the service server 200. The individual certificate is an electronic certificate, which is associated with a service provision contract of the service server 200, unique to the contract. Basically, a certificate that is used by the user terminal 100 for authentication is the individual certificate, and the common certificate is used in a special case.

The registration request unit 122 requests the service server 200 to register the user terminal 100 as a service provision target (installation), cancels the registration as the service provision target of the user terminal 100 (return), and returns the user terminal 100 to a shipment state (initialization) in accordance with a user's instruction or automatically. Such a request is transmitted from the request transmitter 121 to the service server 200.

The certificate registration unit 123 registers a certificate used by the user terminal 100 for communication with the service server 200. The type of certificate to be registered is different according to the state of the user terminal 100, and detailed description of the user terminal 100 will be described later.

The operation request unit 124 requests the service server 200 to perform various operations relating to the provision of a service. This request is transmitted from the request transmitter 121 to the service server 200.

The service server 200 includes an access acceptance unit 221, an authentication processing unit 222, a certificate acquisition unit 223, a contract management unit 224, a contract check unit 225, a request processing unit 226, and a certificate invalidation unit 227.

The access acceptance unit 221 receives a request for authentication using a common certificate or an individual certificate from the user terminal 100, and causes the authentication processing unit 222 to perform device authentication using such a certificate. In addition, the access acceptance unit 221 transmits the request received from the authenticated user terminal 100 to a processor processing the request and causes the request to be processed.

The authentication processing unit 222 has a function for performing device authentication using a common certificate or an individual certificate in response to a request from the access acceptance unit 221. The authentication processing unit 222 inquires a certificate management unit 322 of the CA 300 of the validity of the certificate and the like as required.

The certificate acquisition unit 223 has a function for causing the CA 300 to issue an individual certificate and acquiring the individual certificate in response to a request from the access acceptance unit 221.

The contract management unit 224 has a function to register and manage information of a service provision contract indicating provision of a service to the user terminal 100, in cooperation with the service server 200. The operation of registering a contract in the contract management unit 224 is referred to as a registration sequence. Here, the contract information managed by the contract management unit 224 is illustrated in Table 1.

TABLE 1

| | | CONTRACT INFORMATION | | | | |
|---|---|---|---|---|---|---|
| MANAGE-MENT ID | AID | USER | PROVIDED SERVICE | ACTI-VATION CODE | CON-TRACT PERIOD | ... |
| 1 | 001 | UsrA | ServiceA | ***** | ... | ... |
| 2 | 002 | UsrB | ServiceA | ***** | ... | ... |
| 3 | — | UsrC | ServiceA | ***** | ... | ... |
| 4 | 004 | UsrD | ServiceB | ***** | ... | ... |
| ... | ... | ... | ... | ... | ... | ... |

The contact information of Table 1 stores a "management identification data (ID)", an "AID", a "user", a "provided service", an "activation code", a "contract period", and the like, in association with one another.

The "management ID" is identification information of a contract used for managing a service provision contract.

The "AID" is an activation ID and is identification information used for identifying a user terminal 100 and an applied contract when a service is provided for the user terminal 100 based on a service provision contract.

The user is information of a user who is a contract partner. In a case where a user's account is separately registered, the user ID may be managed as the contract information. Otherwise, contact information and the like may be managed.

The "provided service" is the kind and the range (content) of services provided for the user terminal 100 based on the contract.

The "activation code" is authentication information used when the user terminal 100 is registered as a service provision target according to a corresponding contract. This activation code is delivered from a service provider to a user by using any method such as an electronic mail or distribution of printed paper. In addition, when requesting the service server 200 to perform installation by operating the user terminal 100, a user inputs this activation code to the user terminal 100 to be transmitted to the service server 200.

The "contract period" is an effective period of a corresponding contract.

It is apparent that information other than such information may be included in the contract information.

The contract check unit 225 checks whether or not an operation request is within the range of a contract applied to a user terminal 100 in accordance with an instruction from the access acceptance unit 221 in a case where the request relating to service provision is received from the user terminal 100 authenticated using an individual certificate.

The request processing unit 226 performs a process for the service server 200 to provide a service for a request source according to the request received by the access acceptance unit 221.

The certificate invalidation unit 227 invalidates an individual certificate issued for a user terminal 100 in accordance with an instruction from the access acceptance unit 221. Here, there are two methods for the invalidation, as will be described later in detail.

The CA 300 includes a certificate issuance unit 321 and a certificate management unit 322.

The certificate issuance unit 321 issues an individual certificate including a designated AID based on a request from the certificate acquisition unit 223 of the service server 200.

The certificate management unit 322 manages certificates that are issued. In this example, the certificate management unit 322 manages both the common certificates and the individual certificates. Certificate information managed by the certificate management unit 322, here, is illustrated in Table 2.

TABLE 2

| CERTIFICATE INFORMATION | | | |
|---|---|---|---|
| CERTIFICATE ID | CERTIFICATE | AID | STATE |
| 1 | IndA | 001 | VALID |
| 2 | IndB | 002 | VALID |
| 4 | IndD | 004 | INVALID |
| ... | ... | ... | ... |
| C1 | ComA | common | VALID |
| ... | ... | ... | ... |

The certificate information of Table 2 includes a "certificate ID", a "certificate", and an "AID", in association with one another.

The "certificate ID" is identification information of a certificate that is used for managing the certificate.

The "certificate" is data of an issued certificate, such as a storage area where the data of an issued certificate is stored.

The "AID" is an AID described in a corresponding certificate. In addition, a certificate of which this data is "common" is a common certificate.

The "state" is a state of a certificate. As such states, there are "valid" and "invalid".

In the example illustrated in Table 2, the reason for omission of a certificate ID is that there are cases where a certificate that is issued once is removed including information of issuance, which will be described later.

Next, the states that can be taken by the user terminal 100 in the system according to this embodiment and transitions of the states will be described with reference to FIG. 4.

The user terminal 100 is in a shipment state 41, when the user terminal 100 has been manufactured and ready for shipment by a manufacturer. In this shipment state 41, the user terminal 100 is not a service provision target for the service server 200. Also in the service server 200, an AID is not assigned to a service provision contract.

Thereafter, the user terminal 100 is brought into the user environment 10, and, when an operation of the "installation" (install) for registering the user terminal 100 as a service provision target for the service server 200 is operated by using a user or a service staff, the user terminal 100 transits to an installed state 42. Until this time, there is a premise that the user has a service provision contract with a service provider, and the information is registered in the contract management unit 224. This operation of the "installation" corresponds to an operation for validating the service called "activation".

In the installed state 42, the user terminal 100 is recognized by the service server 200 as a service provision target for the service server. In the service server 200, this recognition is acquired by assigning an AID to the service provision contract with the user, setting an individual certificate including the AID in the user terminal 100, and authenticating the user terminal by using the individual certificate including the assignment of the AID.

In addition, in the installed state 42, when the operation of the "initialization" (initialize) is performed, the user terminal 100 is returned to the shipment state 41. This "initialization" is returning the user terminal 100 to the state at the time of shipment of the user terminal 100 including the registration in the service server 200 and the CA 300 by removing the individual certificate set in the user terminal 100, removing a record indicating the issuance of the individual certificate also in the service server 200 side, and also removing the AID set to the service provision contract. In addition, during the provision of the service for the user terminal 100, in a case where contract information other than the AID relating to the service is changed for any reason, the contract information may not be returned to the original.

Furthermore, when an operation of "return" is performed in the installed state 42, the user terminal 100 transits to an uninstalled state 43. This operation of the "return" may be requested from the user terminal 100 to the service server 200 in accordance with a user operation or may be performed by the service server 200 in accordance with a specific event, an instruction from a supervisor, or the like. In addition, this operation of the "return" is an operation of excluding the user terminal 100 from the service provision target for the service server 200. This operation of the "return" corresponds to an operation for invalidating a service called "activation cancellation".

More specifically, by causing the CA 300 to invalidate the individual certificate issued to the user terminal 100, thereafter, the user terminal 100 does not receive authentication using the individual certificate from the service server 200. In this way, the user terminal 100 is not allowed to use a service provided by the service server 200. In addition, also on the user terminal 100 side, the individual certificate is set to be not used for communication with the service server 200. However, in the service server 200, the AID assigned to the service provision contract remains. Accordingly, the AID included in the invalid individual certificate is assigned.

A difference between the "initialization" and the "return" is that whether or not an individual certificate and an AID are removed. In the "return", since the individual certificate and the AID are not removed, a contract based on which service provision is previously received by the user terminal 100 can be perceived also after the return. In addition, in a case where an individual certificate that has been invalidated once is allowed to be validated again, when the "installation" is performed again, the individual certificate that has been invalidated once can be reused.

In addition, also in the uninstalled state 43, similarly to the case of the installed state 42, by performing the "initialization", the user terminal 100 can be returned to the shipment state 41.

Figure 4:
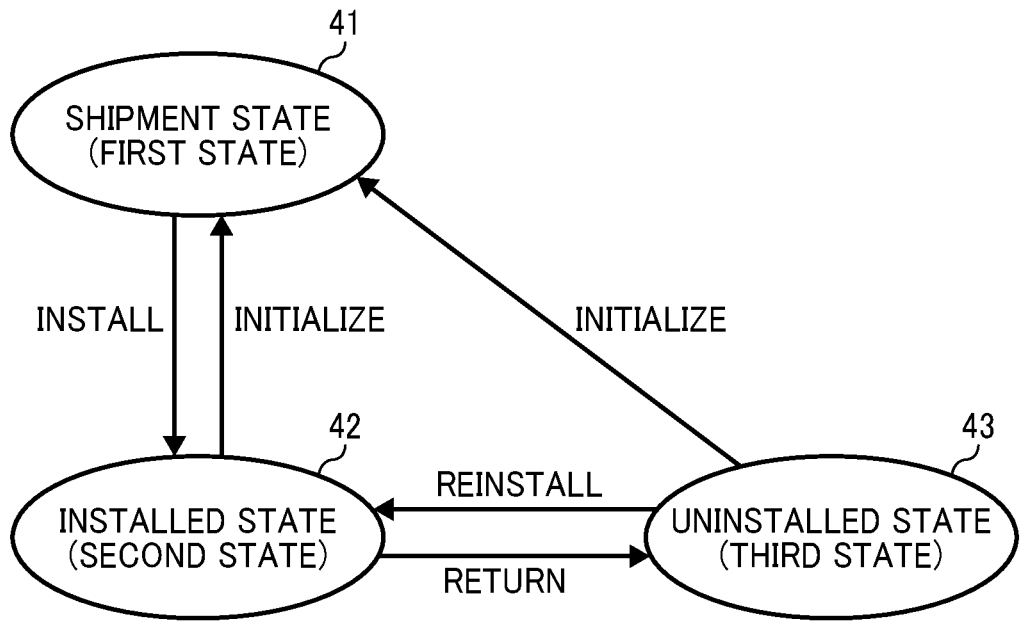
FIG. 4 is a diagram illustrating states to be taken by a user terminal and transitions of the states.
Figure 5:
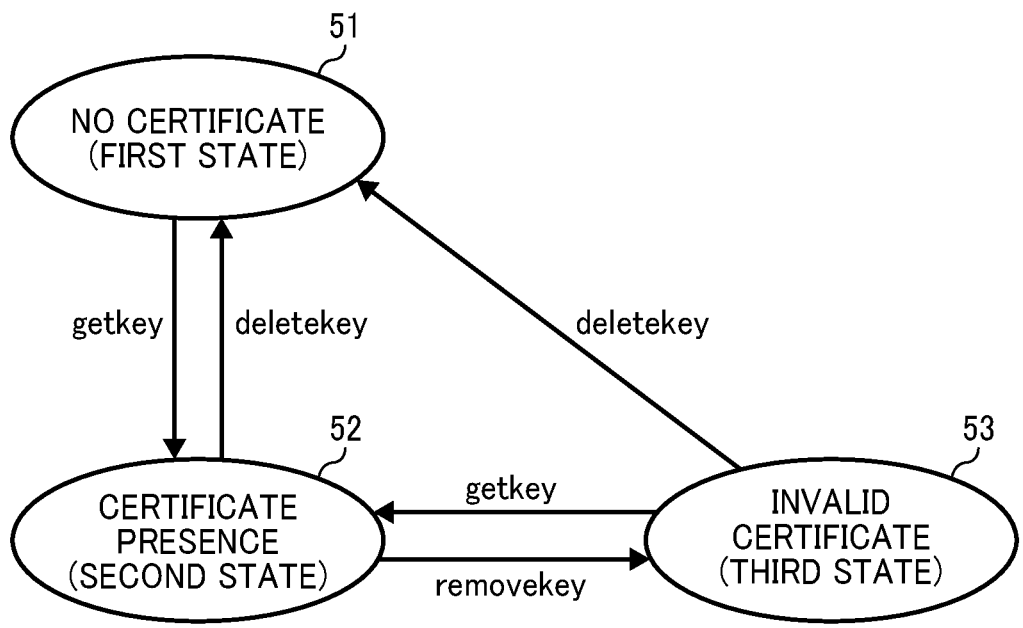
FIG. 5 is a diagram illustrating set states of an individual certificate in a user terminal and transitions of the set states.

Each state of the user terminal 100 illustrated in FIG. 4 corresponds to the state of an individual certificate set in the user terminal 100. FIG. 5 illustrates set states of an individual certificate in a user terminal 100 and transitions of the set states.

In the shipment state 41, an individual certificate is not set to the user terminal 100, and the set state is no-certificate 51. From this state, when the operation of the "installation" is performed, and the individual certificate is set to the user terminal 100, the set state transits to a certificate presence 52 in which a valid individual certificate is set. A command that corresponds to this setting and is used for the user terminal 100 to request the service server 200 to transmit an individual certificate is "getkey".

In addition, in the state of the certificate presence 52, when the operation of the "initialization" is performed, the set state is returned to the no-certificate 51. A command used for the user terminal 100 to request initialization for the service server 200 at this time is "deletekey".

Furthermore, in the state of the certificate presence 52, when an operation of "return" is performed, the set state transits to "invalid certificate" 53 in which an individual certificate is stored but is invalid. A command used for the user terminal 100 to request return for the service server 200 at this time is "removekey".

A transition from the state of the "invalid certificate" 53 to the state of the certificate presence 52 according to reinstallation using the "getkey" command and a transition from the state of the "invalid certificate" 53 to the state of the no-certificate 51 according to initialization using the "deletekey" command correspond to the state transitions illustrated in FIG. 4.

Next, in each of the states illustrated in FIGS. 4 and 5, registration states of certificates stored by the user terminal 100 and the service server 200 and an individual certificate in the CA 300 will be described with reference to FIGS. 6 to 8. For the CA 300, the registration state of an individual certificate set to the user terminal 100 is illustrated.

Figure 6:
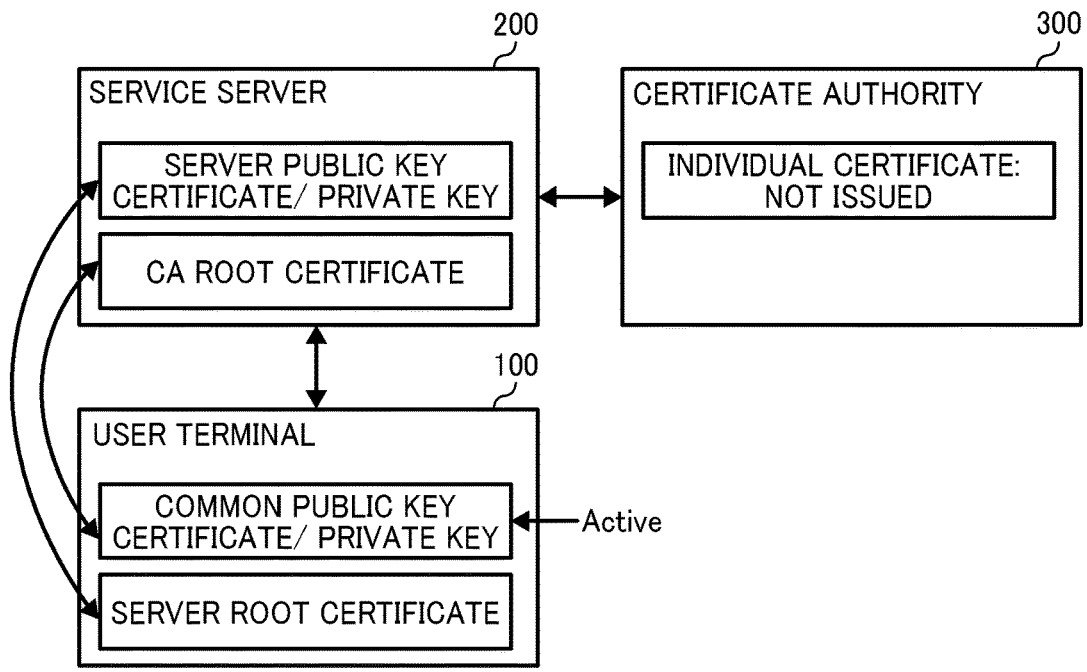
FIG. 6 is a diagram illustrating a certificate and a registration state of an individual certificate in a CA in a shipment state, according to an embodiment.
Figure 7:
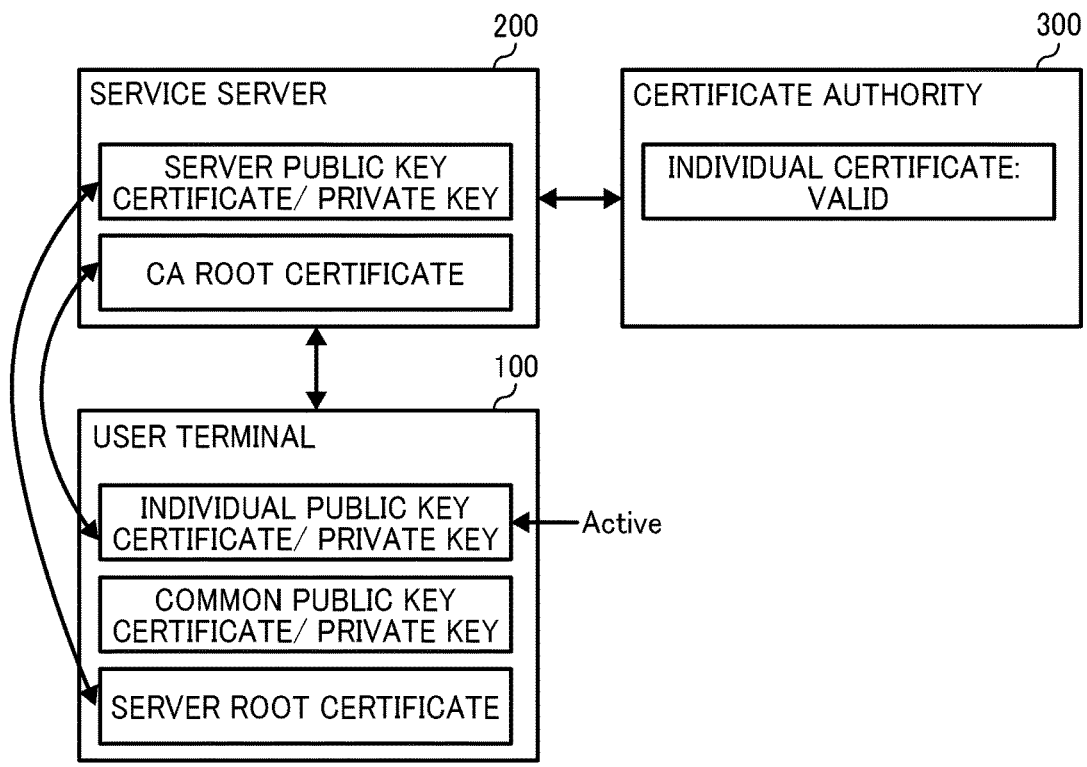
FIG. 7 is a diagram illustrating a certificate and a registration state of an individual certificate in a CA in an installed state, according to an embodiment.
Figure 8:
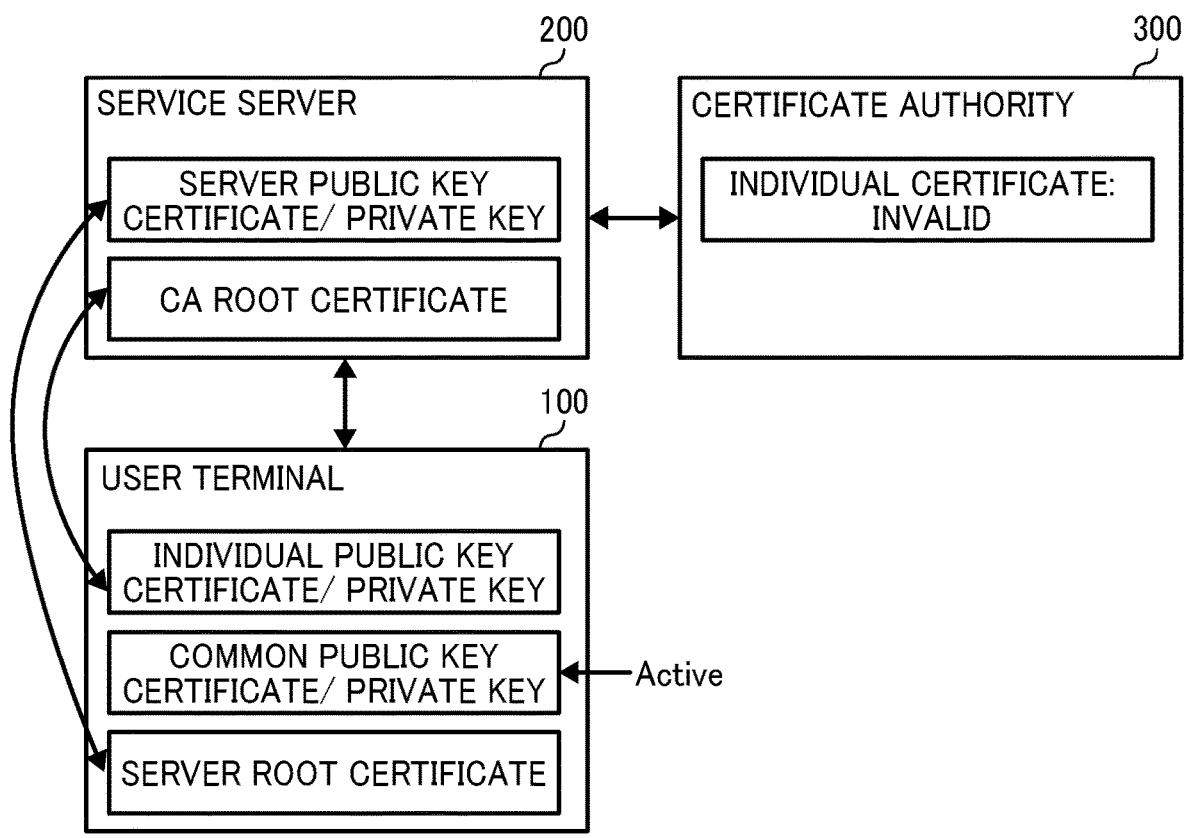
FIG. 8 is a diagram illustrating a certificate and a registration state of an individual certificate in a CA in an uninstalled state, according to an embodiment.

First, as can be understood from FIGS. 6 to 8, in all the states, the user terminal 100 stores a common public key certificate, a private key corresponding to the common public key certificate, and a server route certificate. In addition, the service server 200 stores a server public key certificate, a private key, and a CA route certificate.

The common public key certificate and the private key corresponding to the common public key certificate are used as a public key certificate and a private key of the user terminal 100 side in mutual authentication and encrypted communication with the service server 200. Here, the common public key certificate and the private key corresponding to the common public key certificate are commonly used by apparatuses receiving service provision from the service server 200. However, the common public key certificate and the private key corresponding to the common public key certificate may not be common to all the apparatuses receiving the service provision. For example, the common public key certificate and the private key corresponding to the common public key certificate may be downloaded into the user terminal 100 with being embedded in firmware, and the common public key certificate and the private key corresponding to the common public key certificate may be commonly used among apparatuses having common firmware. In addition, in a case where a private key is leaked, by invalidating the leaked private key and a common public key certificate corresponding to the leaked private key and distributing a new common public key certificate and a private key corresponding to the new common public key certificate with being embedded in firmware of a new version, the common public key certificate and the private key corresponding to the common public key certificate can be updated.

A CA route certificate is a certificate of a certificate authority (here, the CA 300) issuing the common public key certificate, and the service server 200 can check that falsification or the like of a common public key certificate transmitted from the user terminal 100 is not made by using the CA route certificate.

The server public key certificate and the private key are a certificate and a private key, which are unique to the service server 200, used as the public key certificate and the private key of the service server 200 side in mutual authentication and encrypted communication with the user terminal 100. The server route certificate is a certificate of a certificate authority (here, a certificate authority other than the CA 300) issuing the server public key certificate. The user terminal 100 can check whether falsification or the like occurs for the server public key certificate transmitted from the service server 200, using the server route certificate.

In the shipment state illustrated in FIG. 6, since an individual certificate is not set to the user terminal 100, certificates stored in each apparatus are the certificates described above, and information of an individual certificate is not registered also in the CA 300. In addition, in the user terminal 100, a common public key certificate is set to be used for communication with the service server 200.

In the installed state illustrated in FIG. 7, an individual certificate (more particularly, an individual public key certificate and a private key corresponding to the individual public key certificate) is stored in the user terminal 100. In correspondence with the individual certificate, also in the CA 300, information indicating that the individual certificate has been issued and is valid is registered. The individual public key certificate and the private key corresponding to the individual public key certificate are also used as a public key certificate and a private key of the user terminal 100 side in mutual authentication and encrypted communication with the service server 200. The individual public key certificate and the private key corresponding to the individual public key certificate are associated with a service provision contract registered in the service server 200, and an AID assigned to the service provision contract is described. Here, also the individual public key certificate is issued by the same certificate authority as the certificate authority of the common public key certificate, and it can be checked that falsification or the like is not made by using the CA route certificate.

In the installed state, the user terminal 100 is set to use the individual public key certificate for communication with the service server 200. By receiving authentication from the service server 200 using the individual public key certificate, the user terminal 100 can cause the service server 200 to recognize a service provision contract of an AID based on which the service provision target is set.

Also in the uninstalled state illustrated in FIG. 8, certificates that are the same as the certificates of the installed state illustrated in FIG. 7 are stored in the user terminal 100 and the service server 200. However, since an indication representing that the individual public key certificate is invalid is registered in the CA, authentication using the individual public key certificate is unsuccessful in the service server 200. In addition, the user terminal 100 is set to use the common public key certificate for communication with the service server 200. Accordingly, a substantial operation relating to authentication is similar to the operation performed in the shipment state illustrated in FIG. 6.

Figure 9:
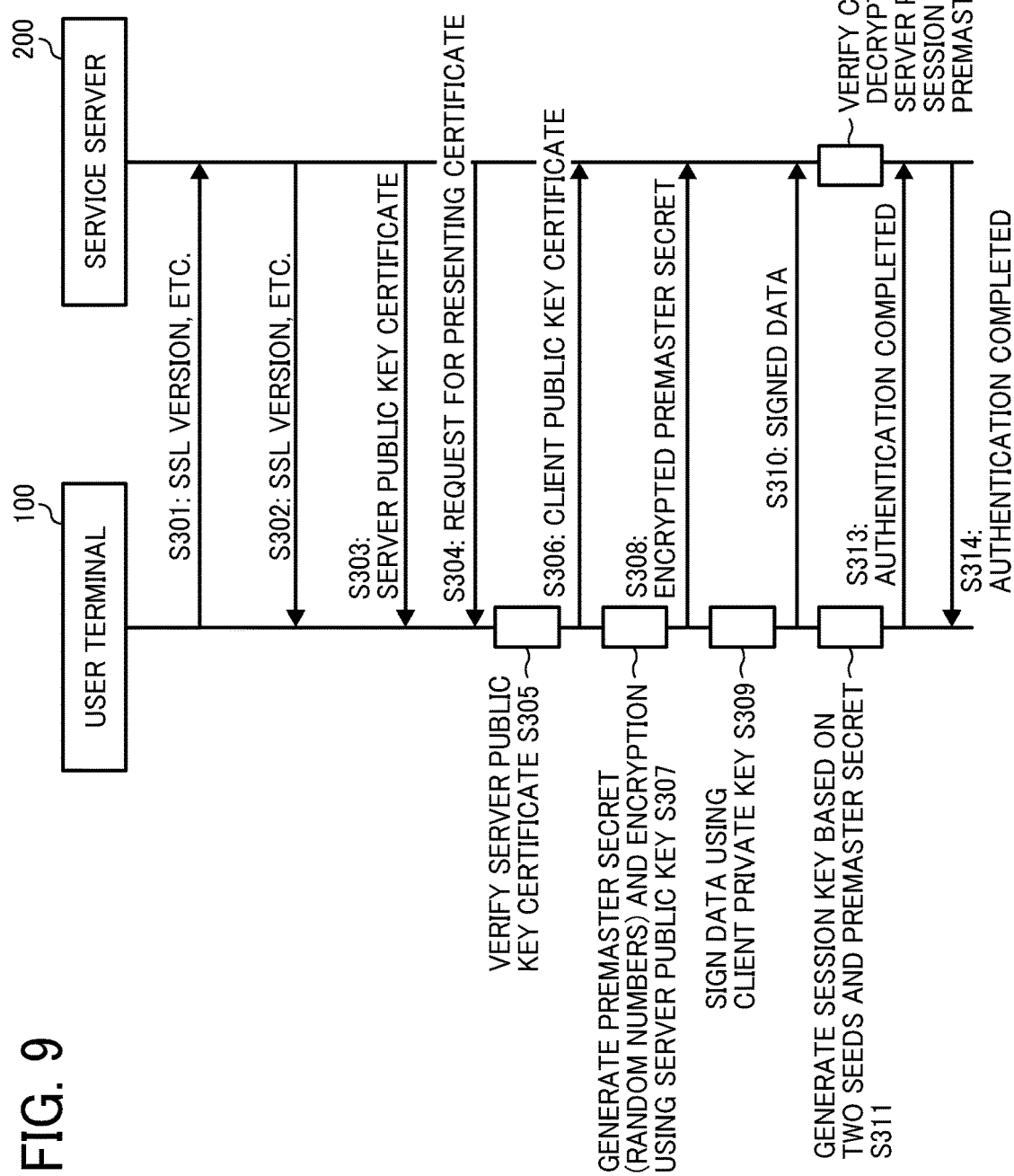
FIG. 9 is a diagram illustrating the sequence of a mutual authentication process using an SSL performed by a user terminal and a service server, according to an embodiment.

FIG. 9 illustrates the sequence of a mutual authentication process using an SSL that is performed between the user terminal 100 and the service server 200 using certificates and the like described with reference to FIGS. 6 to 8. The sequence illustrated in FIG. 9 is not changed regardless of whether a certificate used by the user terminal 100 is an individual public key certificate or a common public key certificate. In FIG. 9, thus, a "client public key certificate" is represented from the meaning of a public key certificate of the client side. In addition, a private key corresponding to the client public key certificate is described as a "client private key".

In the sequence illustrated in FIG. 9, at the time of starting communication, the user terminal 100 transmits an SSL version number, a supported cipher set, a random number, and the like to the service server 200 (S301). The service server 200 transmits the SSL version number, the used cipher set, the random number, and the like to the user terminal 100 (S302). The service server 200 transmits a server public key certificate to the user terminal 100 (S303). The service server 200 requests the user terminal 100 to present a certificate (S304). Thereafter, the service server 200 stands by for a response from the user terminal 100.

When the server public key certificate is received, the user terminal 100 verifies the server public key certificate by using the server route certificate (S305). In a case where the validity of the server public key certificate is checked, the user terminal 100 transmits a client public key certificate to the service server 200 (S306). Subsequently, the user terminal 100 encrypts a premaster secret (random number) calculated from a hash value of the data exchanged up to here by using the server public key included in the server public key certificate (S307). The user terminal 100 transmits the encrypted premaster secret to the service server 200 (S308). The user terminal 100 performs a signature for the random data calculated using the data exchanged up to now by using the client private key (S309). The user terminal 100 transmits the signed random data to the service server 200 (S310). The user terminal 100 generates a session key based on two seeds and the premaster secret (S311).

Subsequently, the service server 200 verifies the received client public key certificate by using a CA route certificate included in the service server 200. The service server 200 verifies signature-attached data by using the client public key certificate. The service server 200 generates a session key by using the premaster secret decrypted using the server private key and two seeds (S312).

Subsequently, the user terminal 100 transmits a message indicating transmission of data using this common key from now on and an SSL authentication end message to the service server 200 (S313). Subsequently, the service server 200 transmits the message indicating transmission of data using this common key from now on and the SSL authentication end message to the user terminal 100 (S314). Thereafter, encrypted communication using the session key is started. Through such encrypted communication, the user terminal 100 transmits apparatus information and the like to the service server 200. Accordingly, in a case where a valid individual public key certificate is not introduced in the user terminal 100, the user terminal 100 does not pass through the authentication illustrated in the drawing and prohibited from establishing communication thereafter.

The process illustrated in FIG. 9 achieves mutual authentication based on a theory in which, in a case where the service server 200 is a forgery server of a person other than the owner of a certificate, the service server 200 does not have a private key, and accordingly, the premaster secret transmitted from the user terminal 100 is not decrypted, and, in a case where the user terminal 100 is a forgery client other than the owner of the certificate, the service server 200 is not able to check a signature from the user terminal 100.

In operations illustrated in sequence diagrams of FIGS. 10 to 14 described below, an authentication process is described to be performed by the service server 200 based on a request from the user terminal 100. However, this is for simplifying the description, and, actually, in the authentication process, the mutual authentication as illustrated in FIG. 9 is performed. However, the mutual authentication may not be performed, but the service server 200 may perform authentication of the user terminal 100.

Next, referring to FIGS. 10 to 14, the sequence of operations relating to the state transitions of the user terminal 100 and the service provision for the user terminal 100, which are performed by the user terminal 100, the service server 200, and the CA 300, will be described.

Figure 10:
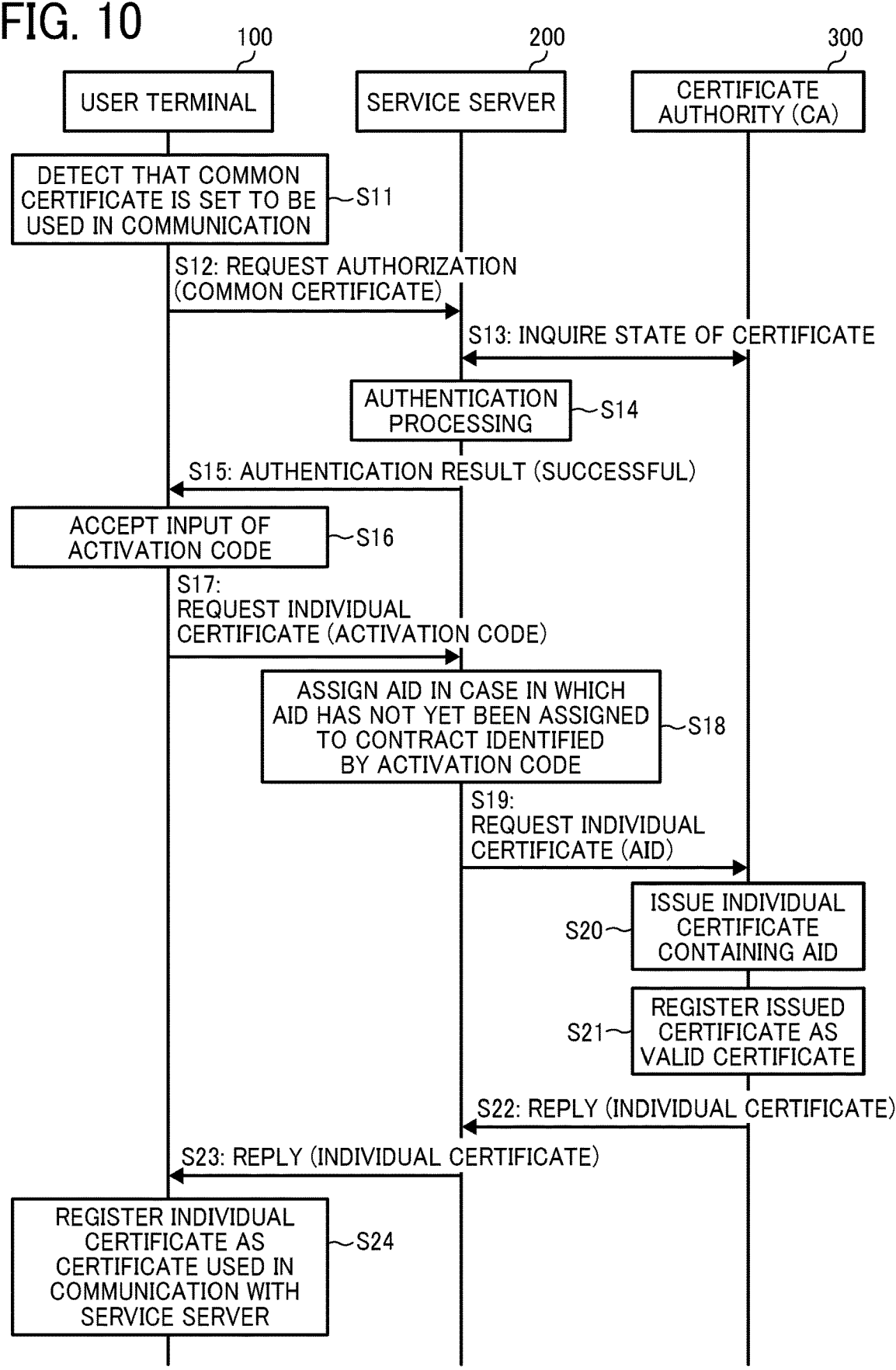
FIG. 10 is a sequence diagram illustrating an installation operation of a user terminal, according to an embodiment.

FIG. 10 illustrates the sequence of the installation operation of the user terminal 100.

In response to receiving a user instruction to access the service server 200, with activation of an application (may be a general browser) used for using a service provided by the service server 200, the user terminal 100 starts the operation illustrated in FIG. 10. When an individual certificate is set to the user terminal 100, the user terminal 100 performs the operation illustrated in FIG. 11, and the operation branches according to a certificate that is set.

In the operation illustrated in FIG. 10, when the user terminal 10 detects that a common certificate is set to be used for communication with the service server 200 (in other words, in a case where the state is the shipment state 41 or the uninstalled state 43) (S11), the user terminal 100 requests the service server 200 to perform authentication using the common certificate (S12). This request is according to the function of the request transmitter 121.

In the service server 200, the access acceptance unit 221 receives this request and causes the authentication processing unit 222 to perform an authentication process. The authentication processing unit 222 inquires the certificate management unit 322 of the CA 300 of the state of the received common certificate (S13).

A response to this inquiry is one of "OK" representing that a corresponding certificate has been issued and is currently valid, "Expire" representing that a corresponding certificate has been issued but the effective period has expired, "Invalid" representing that a corresponding certificate has been issued but is invalided, and "Error" representing that a corresponding certificate has not been issued. In addition, the service server 200 may regularly acquire an expiration list that is a list of expired certificates from the certificate management unit 322 and determine that a certificate not included in the expiration list is valid without inquiring the certificate management unit 322 at each authentication.

In any case, in a case where the common certificate is in a valid state (OK) in step S13, an authentication process using the common certificate is performed (S14). On the other hand, in a case where the common certificate is in an invalid state, or in a case where there is no issuance record, a result of the authentication process is immediately set as unsuccessful authentication. Here, the authentication is assumed to be successful, and, in such a case, the service server 200 transmits an authentication result of successful authentication to the user terminal 100 (S15).

The user terminal 100 that has received this authentication result receives an input of an activation code from the user based on the function of the registration request unit 122 (S16). This activation code is notified to the user in advance as described above and is used for specifying a service provision contract applied to the user terminal 100.

The user terminal 100 transmits an individual certificate request (the getkey command illustrated in FIG. 5) including an activation code input in step S16 to the service server 200 based on the function of the request transmitter 121 (S17).

In the service server 200, the access acceptance unit 221 receives this request, searches for a contract specified by the activation code based on the function of the contract management unit 224 in response to the request, and assigns an AID in a case where an AID has not been assigned to the found contract (S18). The AID may have an arbitrary value that is unique within the service server 200. The search of step S18 is the operation of a search sequence and corresponds to the function of a search unit. In addition, the authentication request using the common certificate and a subsequent request of step S17 correspond to an access from the apparatus.

Next, the service server 200, based on the function of the certificate acquisition unit 223, requests an individual certificate including the AID (the AID that has already been assigned in the case of the assigned state) assigned in step S18 from the CA 300 (S19).

The CA 300 that has received this request, based on the function of the certificate issuance unit 321, issues an individual certificate (and a corresponding private key) in which the designated AID is described (S20). In addition, the CA 300, based on the function of the certificate management unit 322, registers the issued individual certificate in the certificate information represented in Table 2 as a valid certificate (S21). Thereafter, the CA 300 transmits the issued individual certificate to the certificate acquisition unit 223 of the service server 200 (S22). The operations relating to the assignment of an AID and the acquisition of an individual certificate in steps S18 to S22 described above are operations of a certificate acquisition sequence and correspond to the function of a certificate acquisition unit.

In the service server 200, the access acceptance unit 221 acquires the individual certificate described above from the certificate acquisition unit 223 and transmits the acquired individual certificate to the user terminal 100 as a response to the request of step S17 (S23). The operation of this transmission is an operation of a certificate transmission sequence and corresponds to the function of a certificate transmission unit.

In the user terminal 100, the certificate registration unit 123 registers the individual certificate delivered in step S23 as a certificate used at the time of communication for the service server 200 (S24).

According to the operation described above, the user terminal 100, by using the common certificate as a credential, receives issuance of an individual certificate associated with a service provision contract using the AID and can register the individual certificate to be usable at the time of receiving authentication from the service server 200. When viewed from the service server 200, the service server 200 acquires an individual certificate including identification information of a service provision contract applied to the user terminal 100 in response to an access from the user terminal 100, transmits the acquired individual certificate to the user terminal 100 to be set. Accordingly, in a case where the user terminal 100 is authenticated using the individual certificate, according to the service provision contract specified by the identification information included in the individual certificate, a service may be provided for the user terminal 100.

The operation illustrated in FIG. 10 may be automatically started with being triggered upon coupling of the user terminal 100 to the network without being dependent on a user's instruction.

Figure 11:
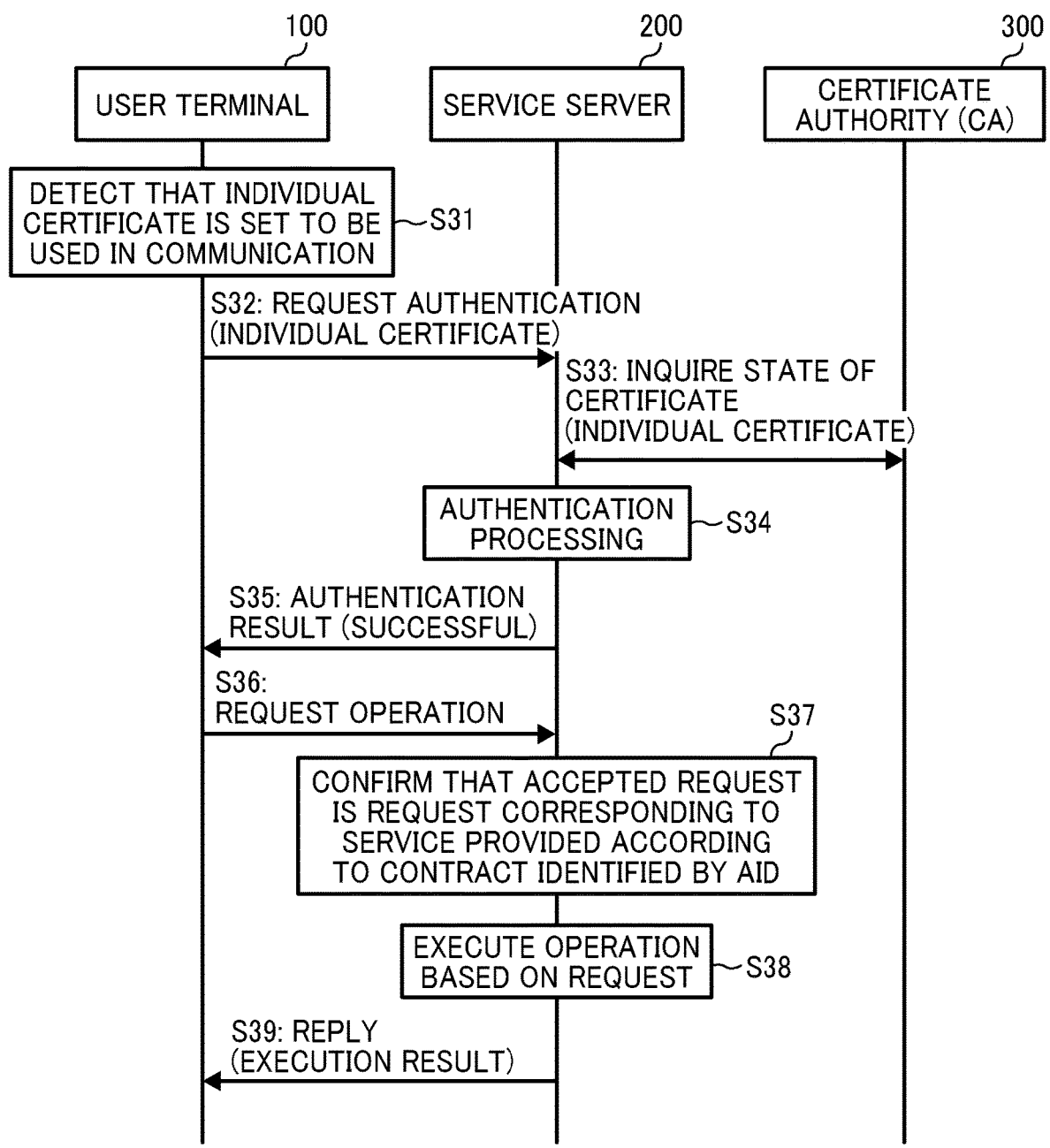
FIG. 11 is a sequence diagram illustrating operation of receiving the provision of a service from a service server, performed by a user terminal, according to an embodiment.

Next, FIG. 11 illustrates the sequence of an operation of the user terminal 100 receiving service provision from the service server 200.

As described with reference to FIG. 10, in a case where the user instructs an access to the service server 200 by operating the user terminal 100, and, at that time, it is detected that the individual certificate is set to be used for communication with the service server 200 (in other words, the state is in the installed state 42) (S31), the user terminal 100 requests the service server 200 to perform authentication using the individual certificate (S32). This request is based on the function of the request transmitter 121.

In the service server 200, the access acceptance unit 221 receives this request and causes the authentication processing unit 222 to perform an authentication process. The authentication processing unit 222 inquires the certificate management unit 322 of the CA 300 of the state of the received individual certificate (S33). In the case of a valid state, the authentication processing unit 222 performs an authentication process using the individual certificate (S34). On the other hand, in a case where the individual certificate is in an invalid state or in a case where there is no issuance record, a result of the authentication process is immediately set to be unsuccessful authentication. Here, the authentication is assumed to be successful, and, in such a case, the service server 200 transmits an authentication result of the successful authentication to the user terminal 100 (S35).

The user terminal 100 that has received the authentication result transmits an operation request requesting an operation relating to a service provided by the service server 200 to the service server 200 based on the function of the operation request unit 124 (S36).

In the service server 200, the access acceptance unit 221 receives this request and determines whether or not the received request is a request within the range of the contract specified by the AID included in the individual certificate used in the authentication process of step S34 in response to the request by referring to the contract management unit 224 (S37). Here, in a case where the request is checked to be within the range of the contract, the request processing unit 226 executes an operation relating to this request (S38) and returns a response of an execution result to the user terminal 100, which is a request source, through the access acceptance unit 221.

On the other hand, in a case where the request is not within the range of the contract in step S37, the access acceptance unit 221 returns a response indicating that an operation relating to the request is not to be executed to the user terminal 100 (S39).

According to the operation described above, the service server 200 can provide a service based on a service provision contract represented by the AID included in the individual certificate for the apparatus authenticated using the individual certificate.

Figure 12:
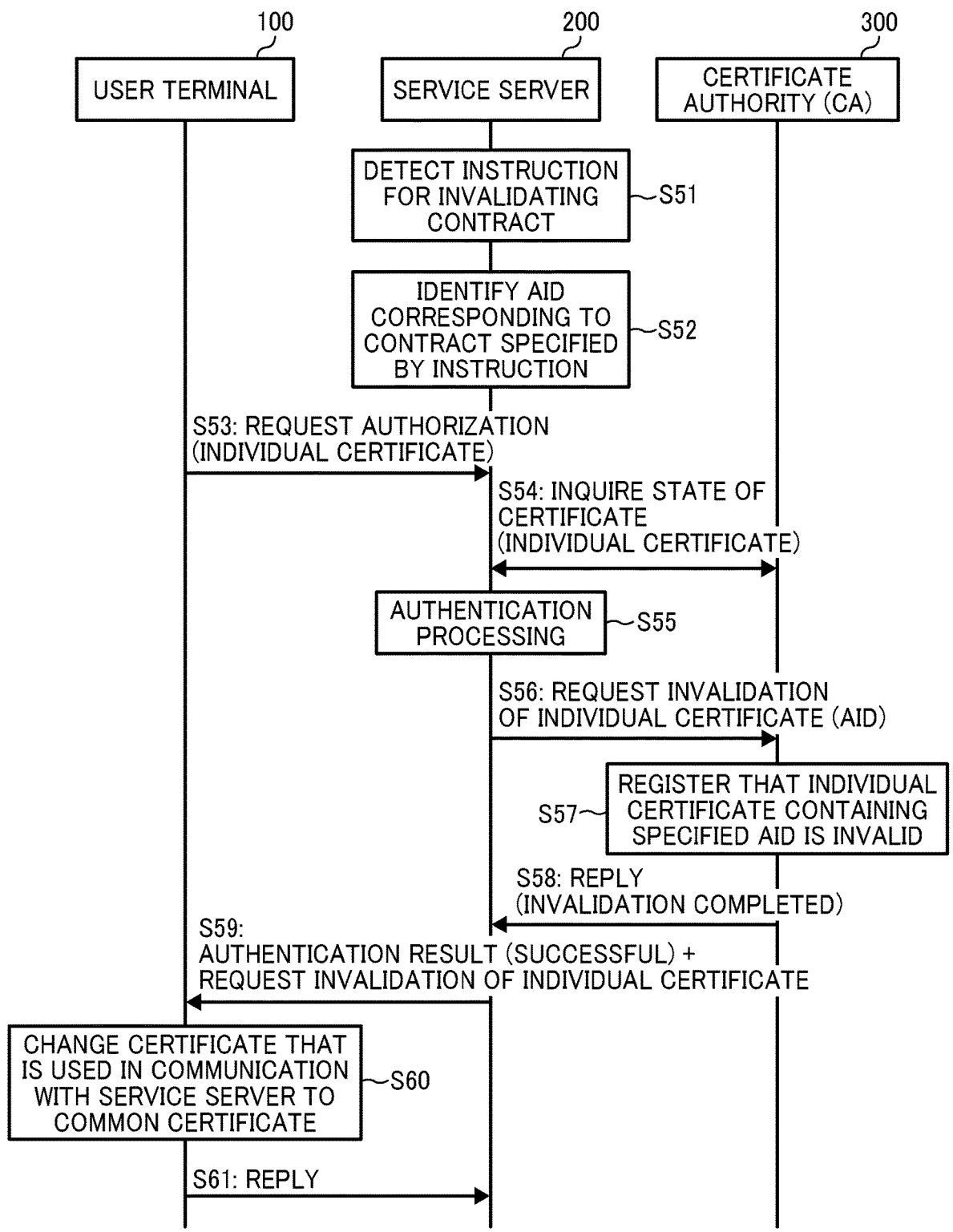
FIG. 12 is a sequence diagram illustrating operation of invalidating a service provision contract and returning an individual certificate that is performed by a service server.

In addition, the process of return and initialization described in sequence diagrams of FIG. 12 and subsequent drawings can be regarded as one type of service provision based on the service provision contract. In addition, the operation illustrated in FIG. 11 may be automatically started by the user terminal 100 with being triggered upon an elapse of a predetermined time or the like without being dependent on a user's instruction. Such a case is a case where the state of the user terminal 100 is regularly notified to the service server 200 to be monitored or the like.

FIG. 12 illustrates the sequence of an operation of the service server 200 for invalidating a service provision contract for the user terminal 100 in response to a contract invalidation instruction and returning the individual certificate to the user terminal 100.

In such a case, in a case where the contract invalidation instruction specifying a service provision contract is detected (S51), the service server 200 starts an operation illustrated in FIG. 12. In addition, this invalidation instruction may be issued according to an instruction by a supervisor of the service server 200 or the like or be automatically generated according to a specific event such as arrival of a contract term.

In any case, the service server 200 specifies an AID assigned to the AID of the contract relating to the invalidation instruction by referring to the contract management unit 224 based on the function of the certificate invalidation unit 227 (S52). Thereafter, the process stands by until authentication using an individual certificate including the AID is requested.

When authentication using the individual certificate including the AID specified in step S52 is requested from the user terminal 100 (S53), similarly to the case of steps S33 and S34 illustrated in FIG. 11, the authentication process is performed (S54 and S55). In a case where the authentication is successful, the service server 200 requests the CA 300 to invalidate the individual certificate including the AID specified in step S52 based on the function of the certificate invalidation unit 227 (S56).

The CA 300 that has received this request registers an indication representing that the individual certificate in which the designated AID is described is invalid in the certificate information of Table 2 based on the function of the certificate management unit 322 (S57) and returns the result to the service server 200 (S58).

The service server 200 that has received this response transmits an indication representing successful authentication as a response to the authentication request of step S53 and an individual certificate invalidation request (the removekey command illustrated in FIG. 5) based on the function of the access acceptance unit 221 (S59). The AID included in the contract information of Table 1 may remain as the original AID.

The user terminal 100 that has received the individual certificate invalidation request changes a certificate used for communication with the service server 200 among certificates registered in the certificate registration unit 123 as a common certificate to invalidate the individual certificate in the communication with the service server 200 (S60). Then, the response is returned to the service server 200 (S61).

In the operations described above, the operations of steps S56 and S59 correspond to the function of an invalidation unit.

According to the operation described above, the service server 200 invalidates an arbitrary service provision contract at desired timing to cause the user terminal 100 that has provided the service based on the contract not to provide the service thereafter. A time for the standby for an access in step S53 is considered not to be that long in a case where the user terminal 100 regularly accesses the service server 200. However, even in the case of standby for a long time, during the time, there is no access from the user terminal 100, and thus, no service is provided for the user terminal 100, and accordingly, this point, in particular, causes no problem.

Figure 13:
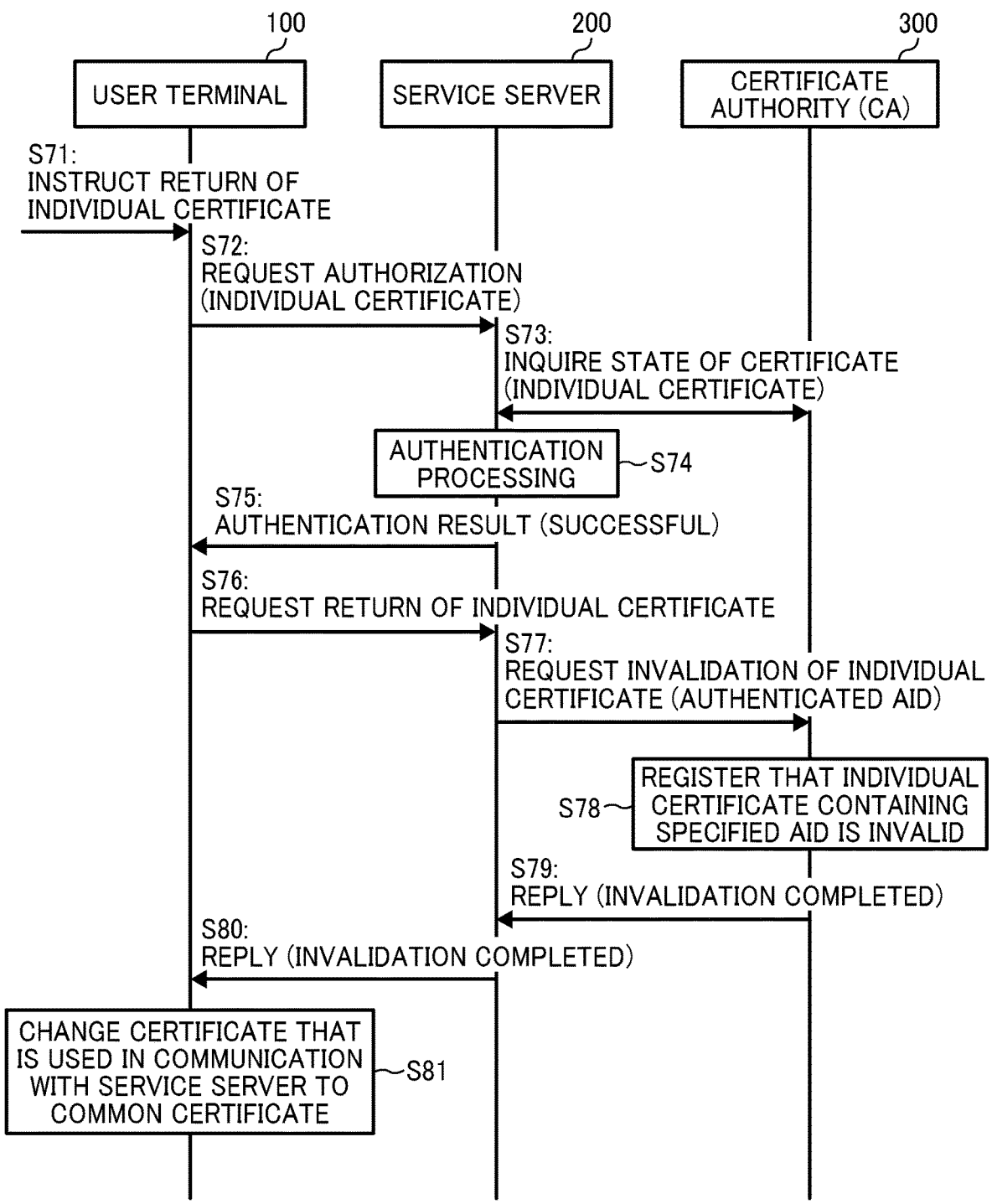
FIG. 13 is a sequence diagram illustrating operation of returning an individual certificate, performed by a user terminal, according to an embodiment.

FIG. 13 illustrates the sequence of an operation of returning an individual certificate in response to an instruction from a user that is performed by the user terminal 100.

In this case, in a case where an individual certificate returning instruction from a user is detected (S71), the user terminal 100 starts an operation illustrated in FIG. 13. Then, in the case of a state in which authentication has not been received from the service server 200, similarly to the case of steps S32 to S35 illustrated in FIG. 11, the user terminal 100 receives authentication using an individual certificate (S72 to S75). Thereafter, the user terminal 100 transmits an individual certificate returning request (the removekey command illustrated in FIG. 5) to the service server 200 based on the function of the registration request unit 122 (S76).

The service server 200 that has received this request, similarly to the case of steps S56 to S58 illustrated in FIG. 12, requests the CA 300 to register that the individual certificate is invalidated (S77 to S79). An AID used here is the AID included in the individual certificate used for the authentication of step S74. In addition, the AID included in the contract information of Table 1 may remain as the original AID.

After step S79, the service server 200 notifies the user terminal 100 that invalidation has been completed based on the function of the access acceptance unit 221 as a process for an individual certificate returning request (S80). The user terminal 100 that has received this response, similarly to the case of step S60 illustrated in FIG. 12, changes a certificate used for communication with the service server 200 among certificates registered in the certificate registration unit 123 as a common certificate (S81).

In the operations described above, the operation of step S77 corresponds to the function of an invalidation unit.

According to the operations described above, the service server 200 can cause a user terminal 100 not to provide the service thereafter in response to a request from the user terminal 100.

Figure 14:
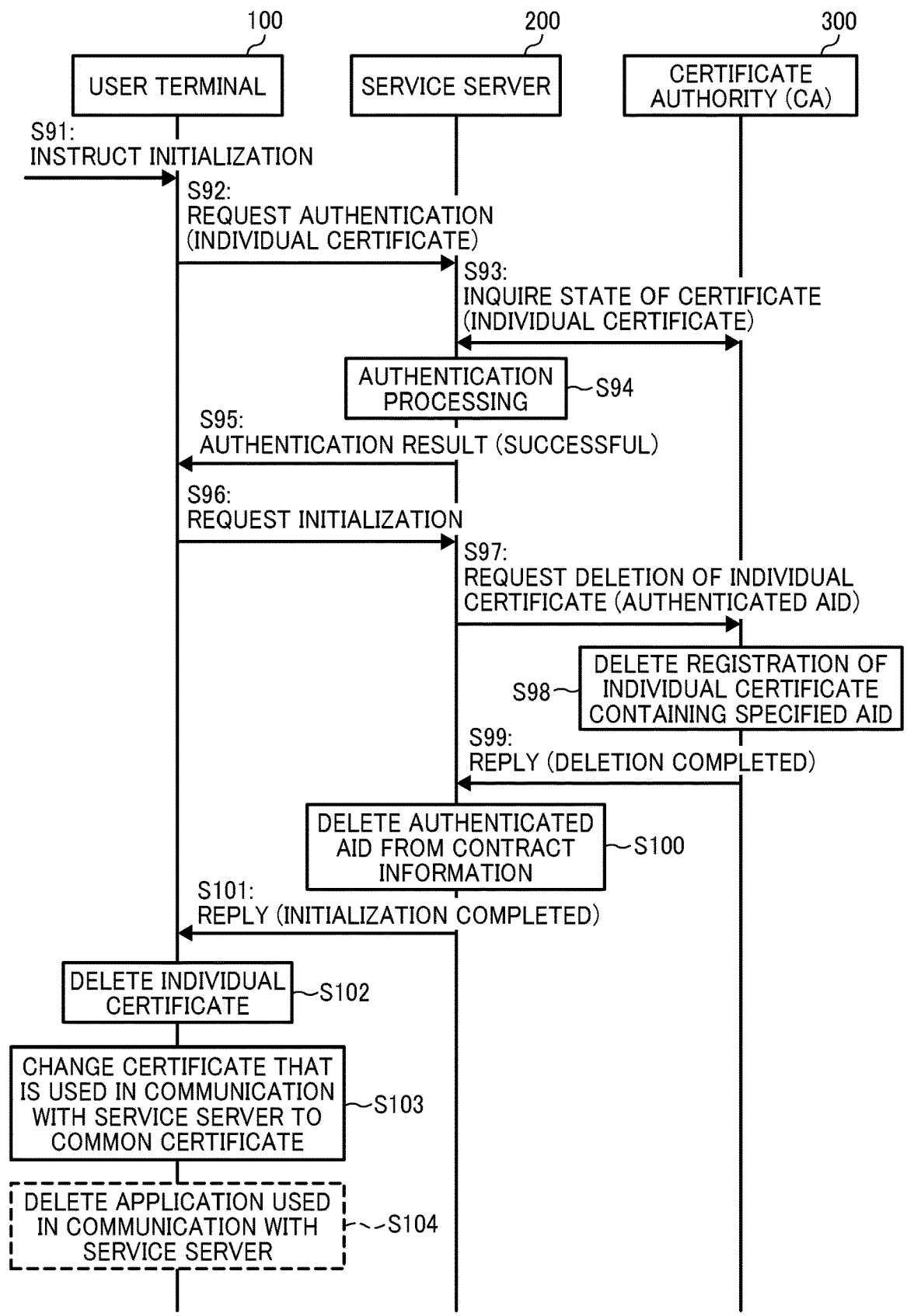
FIG. 14 is a sequence diagram illustrating operation of initializing a user terminal, performed by the user terminal, according to an embodiment.

FIG. 14 illustrates the sequence of an operation of initializing a user terminal 100, which is performed by the user terminal 100, in response to an instruction from a user.

In this case, in a case where an initialization instruction from a user is detected (S91), the user terminal 100 starts an operation illustrated in FIG. 14. Then, in the case of a state in which authentication has not been received from the service server 200, similarly to the case of steps S32 to S35 illustrated in FIG. 11, authentication using an individual certificate is received (steps S92 to S95). Thereafter, based on the function of the registration request unit 122, the user terminal 100 transmits an initialization request (the deletekey command illustrated in FIG. 5) to the service server 200 (S96).

The service server 200 that has received this request, based on the function of the certificate invalidating unit 227, requests the CA 300 to remove the registration of an individual certificate (an individual certificate used for authentication) including an AID included in the individual certificate used for the authentication of step S94 (S97). The operation of this step S98 is an operation corresponding to the function of a registration removing unit.

The CA 300 that has received this request removes the registration of issuance of an individual certificate in which the designated AID is described from the certificate information of Table 2 based on the function of the certificate management unit 322 (S98). In this way, the individual certificate in which the AID is described is regarded not to have been issued from the start. Thereafter, the CA 300 returns a result of the removal to the service server 200 as a response to the request of step S97 (S99).

The service server 200 that has received the response of step S99 removes the AID included in the individual certificate used for the authentication of step S94 from the contract information of Table 1 based on the function of the contract management unit 224 (S100). In this way, the contract to which the AID is assigned until then is returned to the state in which the AID is not assigned.

After step S100, the service server 200 notifies the user terminal 100 of the completion of the initialization based on the function of the access acceptance unit 221 as a process for the initialization request (S101). The user terminal 100 that has received this response removes an individual certificate registered in the certificate registration unit 123 and a corresponding private key (S102) and changes the certificate used for communication with the service server 200 as a common certificate (S103). In addition, in a case where an application dedicated for the communication with the service server 200 is used, and the application is not installed in the shipment state, the application is removed as well (S104).

According to the operations described above, the service server 200, in response to a request from the user terminal 100, can stop the provision of the service for the user terminal 100 thereafter and return the individual certificate and the AID used by the user terminal 100 to the state in which the individual certificate and the AID are not issued.

In the system described above, an individual certificate is managed in association with a service provision contract and causes a user terminal that is a service provision target to use an individual certificate including an AID assigned to the contract. In this way, also in a case where the user terminal 100 that is the service provision target is replaced during the contract, a relation with the contract and the user terminal 100 that is the service provision target can be easily perceived. In particular, also in a case where one user terminal 100 is desired to be operated based on a service provision contract that is different according to a situation, by performing activation cancellation and re-activation at the time of switching of the contract, a plurality of contracts can be used without any problem.

In addition, by arranging the uninstalled state 43 in addition to the shipment state 41 and the installed state 42, also in a case where activation and activation cancellation are repeated for the same user terminal 100 a plurality of number of times, such a process can be efficiently managed, and the security of communication between the user terminal 100 and the service server 200 can be acquired. In other words, in a case where re-activation is assumed, by performing activation cancellation in the "return", the activation can be canceled with the AID remaining. Then, next, in a case where activation is performed from another user terminal 100, the remaining AID can be successively used.

Furthermore, in a case where an individual certificate that has been invalidated once is allowed to be validated again, at the time of re-activation, an individual certificate may not be reissued, and an individual certificate that has been invalidated at the time of activation cancellation may be set to be valid again. Accordingly, the number of issues of certificates is decreased, whereby the load of the management of the certificates can be reduced.

Figure 15:
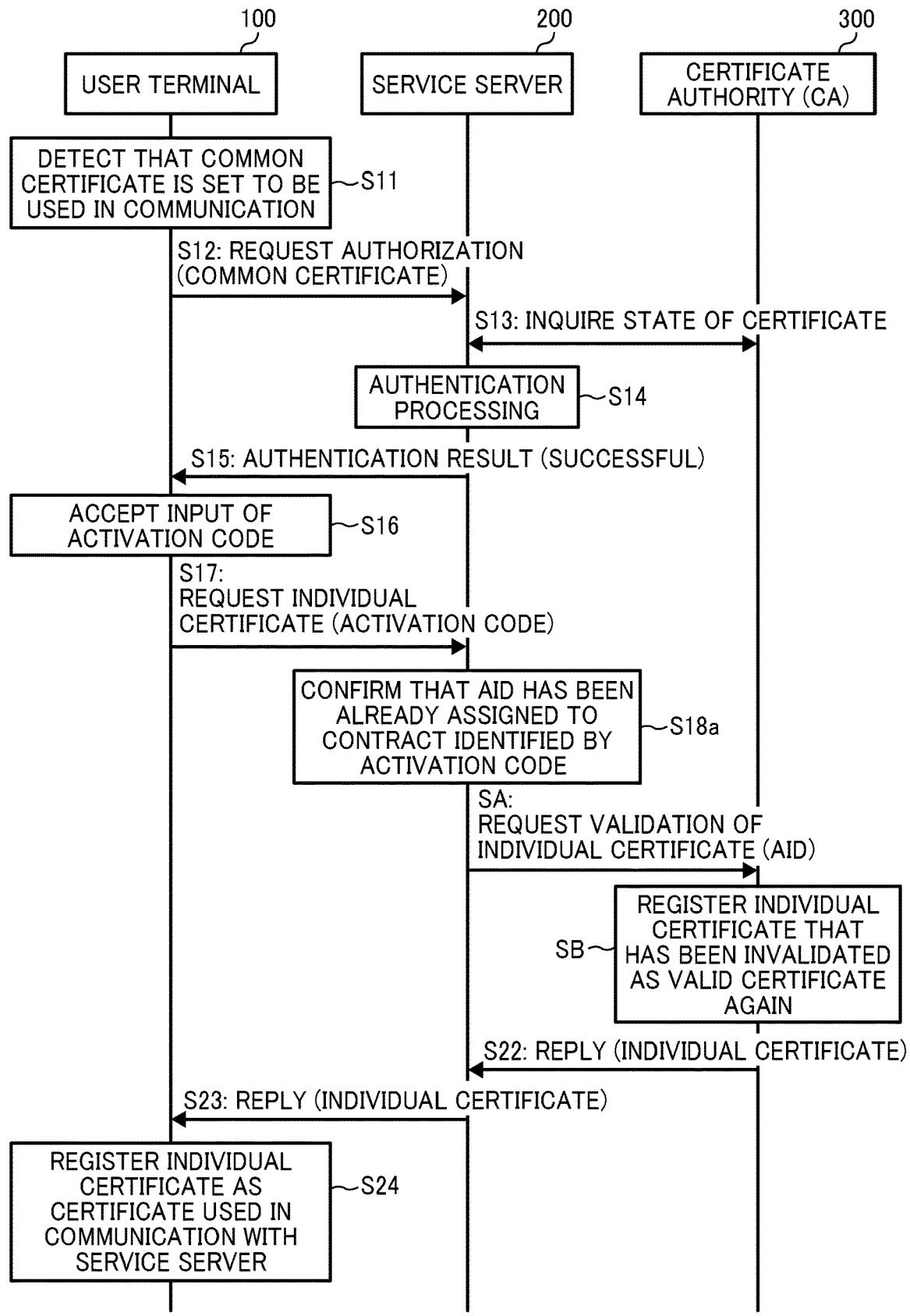
FIG. 15 is a sequence diagram illustrating a reinstallation operation of a user terminal, according to an embodiment.

In a case where such a configuration is employed, the operation, which is performed at the time of re-activation (reinstallation), illustrated in FIG. 10 is as illustrated in FIG. 15. In other words, in step S18' according to the request of step S17, a state is formed in which an AID has been assigned to a contract specified by the activation code. Accordingly, the service server 200 requests the CA 300 to validate an individual certificate with the AID that has been assigned specified (SA), and the CA 300, in response to the request, registers an indication representing re-validation of an individual certificate that has been invalidated once including the AID in the certificate information of Table 2 (SB).

The operation performed thereafter may be similar to the operation of step S22 and subsequent steps illustrated in FIG. 10. However, an individual certificate transmitted in step S22 is an issued individual certificate registered as the certificate information. Here, the reason for the re-transmission of the individual certificate is that there is a possibility that a user terminal 100 performing activation cancellation and a user terminal 100 performing re-activation are different from each other, and an individual certificate is not yet registered in the user terminal 100 performing the re-activation.

In addition, in addition to the description presented above, since an individual certificate and an AID can be completely removed by performing "initialization", a request for not leaving information relating to the system in an apparatus excluded from the service provision target or a request for not leaving information of an apparatus excluded from the service provision target on the service server 200 side can be also responded.

The system described above, for example, may be considered to be applied to a remote monitoring system in which an image processing apparatus such as a copying machine, a printer, a facsimile equipment, or a digital multifunction peripheral that is a user terminal 100 installed to a customer office or the like is remotely monitored from a service server 200.

This remote monitoring system transmits information (information representing various counter values, operation statuses, and the like; hereinafter, referred to as "apparatus information") of the monitoring target to the service server 200 of the cloud environment 20 by using encrypted communication such as an SSL through mutual authentication. In addition, when the apparatus monitoring system is normally operated, the service server 200 provides an apparatus monitoring service for receiving apparatus information from the user terminal 100 and accumulating the apparatus information. In addition, based on the apparatus information, a service for monitoring the occurrence of an abnormality, running-out of supply, or the like may be considered to be provided.

In addition, the service server 200, in a process for securing the safety of communication performed from the user terminal 100 for the cloud environment 20, performs mediation between the user terminal 100 and the CA 300.

More specifically, the service server 200 requests the CA 300 to issue data including a unique private key, a public key certificate, and the like for each installation of the user terminal 100 in response to a request from the user terminal 100 and replies to the user terminal 100 with an individual certificate package issued to the CA 300.

The private key, the public key certificate, and the like (individual certificate package) are used for mutual authentication or encrypted communication with the service server 200 of the cloud environment 20 when the user terminal 100 transmits apparatus information. In this embodiment, the individual certificate package is a package of electronic certificates based on public key cryptography standards (PKCS). The service server 200 also maintains the activation function of the apparatus and activates the apparatus.

As above, while the description of the embodiment has been presented, a specific configuration of an apparatus, the sequence of a specific process, a data format, the kinds and the number of certificates, a communication protocol, a network configuration, and the like are not limited to those described in the embodiment.

For example, in the embodiment described above, while an activation code is used for the activation illustrated in FIG. 10 or the like, the code may not be used. Instead of the activation code, it may be considered such that contracts associated with a user can be searched using an ID, a password, or the like of the user, and a contract to be associated with the user terminal 100 among the contracts can be selected by the user.

For example, it may be configured such that the function of each apparatus according to the embodiment described above is distributed in a plurality of apparatuses, and a specific function is achieved by incorporating such apparatuses. To the contrary, functions arranged to be distributed in a plurality of apparatuses may be arranged to be integrated in one apparatus. For example, the service server 200 may be configured by a plurality of apparatuses achieving the function in association with each other. In addition, the service server 200 and the CA 300 may be integrated into one body.

In addition, a program according to an embodiment of the present invention is a program that is used for realizing the function of the user terminal 100, the service server 200, or any other apparatus according to the embodiment described above by controlling hardware included in a computer.

Such a program may be stored in a ROM or another non-volatile storage medium (a flash memory, an electrically erasable programmable read-only memory (EEPROM), or the like) included in the computer from the start. However, the program may be provided with being recorded on an arbitrary non-volatile recording medium such as a memory card, a compact disc (CD), a digital versatile disc (DVD), or a Blu-ray disc. By installing the program recorded on such a recording medium and executing the program, each function described above can be realized.

In addition, the program may be downloaded from an external apparatus including a recording medium on which the program is recorded or an external apparatus in which the program is stored in a storage unit, which is coupled to a network, installed to a computer, and executed.

Furthermore, it is apparent that the configurations of the embodiments and modified examples described as above may be arbitrarily combined as long as the configurations are not contradictory.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising:
   a memory to store, for each one of a plurality of users, information regarding a service provision contract indicating a content of services to be provided to the user; and
   circuitry configured to cause the information processing apparatus to,
   obtain a service provision contract indicating services to be provided to a first user in response to an access from the first user, the first user being one of the plurality, of users;
   assign first identification information to the service provision contract for the first user;
   cause an electronic certificate to be generated based on the service provision. contract:
   obtain, from a certificate authority, the electronic certificate including the first identification information assigned to the service provision contract for the first user, as an individual certificate for the first user;
   transmit the individual certificate to a transmission destination associated with the first user;
   determine to provide services according to the service provision contract to an apparatus authenticated using the individual certificate; and
   in response to a request for initializing the individual certificate from the transmission destination, cause the information processing apparatus to instruct the certificate authority to remove a record indicating issuance of the individual certificate, and deregister the first identification information in the information from the service provision contract.

2. The information processing apparatus according to claim 1, wherein, in response to an instruction for invalidating the service provision contract for the first user,
   the circuitry is configured to cause the information processing apparatus to instruct the certificate authority to invalidate the individual certificate including the first identification information.

3. The information processing apparatus according to claim 2, wherein, when the individual certificate is invalidated, the circuitry causes the information processing apparatus to request the transmission destination of the individual certificate not to use the individual certificate including the first identification information.

4. The information processing apparatus according to claim 2, wherein, when the information processing apparatus determines that the first identification information has been assigned to the service provision contract for the first user that is obtained,
   the circuitry causes the information processing apparatus to determine that the individual certificate for the first user has been invalidated, and instruct the certificate authority to re-validate the individual certificate including the first identification information.

5. The information processing apparatus according to claim 1, wherein, in response to a request for invalidating the individual certificate from the transmission destination, the circuitry cause the information processing apparatus to instruct the certificate authority to invalidate the individual certificate including the first identification information.

6. The information processing apparatus according to claim 1,
   wherein the circuitry is configured to cause the information processing apparatus to register the first identification information assigned to the service provision contract for the first user with the information regarding the service provision contract.

7. The information processing apparatus according to claim 1,
   wherein the circuitry is configured to cause the information processing apparatus to register a state of the service provision contract indicating at least one of:
   a first state in which the first identification information is not assigned;
   a second state in which the first identification information is assigned and the individual certificate is valid; and
   a third state in which the first identification information is assigned and the individual certificate is invalid.

8. The information processing apparatus of claim 1, wherein the circuitry is configured to cause the certificate authority to generate the electronic certificate.

9. The information processing apparatus of claim 1, wherein the first identification information is an activation identification.

10. An information processing system comprising:
    a memory to store, for each one of a plurality of users, information regarding a service provision contract indicating a content of services to be provided to the user; and
    first circuitry and second circuitry configured to operate in cooperation to cause the information processing system to,
    obtain a service provision contract indicating services to be provided to a first user in response to an access from the first user, the first user being one of the plurality of users,
    assign first identification information to the service provision contract for the first user,
    register the first identification information to the information regarding the service provision contract stored in the memory,
    cause an electronic certificate to be generated based on the service provision contract,
    obtain, from a certificate authority, the electronic certificate including the first identification information assigned to the service provision contract for the first user, as an individual certificate for the first user,
    control to register the individual certificate in a first apparatus associated with the first user, as a certificate to be used for authentication,
    determine to provide services according to the service provision contract identified to the first apparatus authenticated using the individual certificate;
    instruct the certificate authority to remove a record indicating issuance of the individual certificate; and
    deregister the first identification information from the information regarding the service provision contract.

11. The information processing system according to claim 10, wherein, in response to a request for initializing the individual certificate for the first user, the first circuitry and the second circuitry are further configured to cause the information processing system to instruct the certificate authority to remove a record indicating issuance of the individual certificate.

12. The information processing system of claim 10, wherein the first circuitry and the second circuitry are configured to operate in cooperation to cause the information processing system to cause the certificate authority to generate the electronic certificate.

13. The information processing system of claim 12, wherein the first circuitry and the second circuitry are configured to operate in cooperation to cause the information processing system to request the electronic certificate from the certificate authority after assigning the first identification information.

14. The information processing system of claim 13, wherein the first identification information is an activation identification.

15. An information processing method comprising:
   storing in a memory, for each one of a plurality of users, information regarding a service provision contract indicating a content of services to be provided to the user;
   obtaining a service provision contract indicating services to be provided to a first user in response to an access from the first user, the first user being one of the plurality of users;
   assigning first identification. information to the service provision contract for the first user;
   cause an electronic certificate to be generated based on the service provision contract:
   obtaining, from a certificate authority, the electronic certificate including the first identification information assigned to the service provision contract for the first user, as an individual certificate for the first user;
   transmitting the individual certificate to a transmission destination associated with the first user;
   determining to provide services according to the service provision contract to an apparatus authenticated using the individual certificate;
   instructing the certificate authority to remove a record indicating issuance of the individual certificate; and
   deregistering the first identification information in the information from the service provision contract.

16. The information processing apparatus of claim 8, wherein the circuitry is configured to cause the information processing apparatus to request the electronic certificate from the certificate authority after assigning the first identification information.

* * * * *